US012686800B2

(12) United States Patent
Choi et al.

(10) Patent No.: US 12,686,800 B2
(45) Date of Patent: Jul. 21, 2026

(54) ADHESIVE AGENT COMPOSITION, SURFACE PROTECTION FILM, AND METHOD OF MANUFACTURING ORGANIC LIGHT-EMITTING ELECTRONIC DEVICE

(71) Applicant: LG CHEM, LTD., Seoul (KR)

(72) Inventors: Jeong Min Choi, Daejeon (KR); Hyun Cheol Kim, Daejeon (KR); Sojin Kim, Daejeon (KR); Hyungoo Kang, Daejeon (KR); Jae Seung Lim, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 931 days.

(21) Appl. No.: 17/292,311

(22) PCT Filed: Dec. 5, 2019

(86) PCT No.: PCT/KR2019/017078

§ 371 (c)(1),
(2) Date: May 7, 2021

(87) PCT Pub. No.: WO2020/116951

PCT Pub. Date: Jun. 11, 2020

(65) Prior Publication Data

US 2021/0395581 A1 Dec. 23, 2021

(30) Foreign Application Priority Data

Dec. 5, 2018 (KR) ........................ 10-2018-0155081

(51) Int. Cl.
*C09J 175/04* (2006.01)
*C08K 5/00* (2006.01)
(Continued)

(52) U.S. Cl.
CPC ........... *C09J 175/04* (2013.01); *C08K 5/0025* (2013.01); *C08L 33/066* (2013.01); *C08L 33/08* (2013.01);
(Continued)

(58) Field of Classification Search
None
See application file for complete search history.

(56) References Cited

U.S. PATENT DOCUMENTS 7,070,051 B2 * 7/2006 Kanner ............ A61B 17/06133 206/460
9,321,944 B2 * 4/2016 Matsumoto ......... C08F 293/005
(Continued)

FOREIGN PATENT DOCUMENTS

CN 101376797 A 3/2009
CN 102640277 A 8/2012
(Continued)

OTHER PUBLICATIONS

Machine translation of JP_03006277_A (Year: 1991).*
Machine translation of JP-2016121310-A (Year: 2016).*

*Primary Examiner* — Frank D Ducheneaux
(74) *Attorney, Agent, or Firm* — Ricky Lam

(57) ABSTRACT

The present disclosure relates to an adhesive composition comprising a urethane polymer; an acryl-based polymer; and a curing agent, wherein the acryl-based polymer comprises a (meth)acrylate monomer comprising silicone; and a (meth) acrylate monomer comprising a hydroxyl group as a monomer unit, a surface protective film, and a method for manufacturing an organic light emitting electronic device.

4 Claims, 2 Drawing Sheets

(51) Int. Cl.

| | |
|---|---|
| ***C08L 33/06*** | (2006.01) |
| ***C08L 33/08*** | (2006.01) |
| ***C08L 33/14*** | (2006.01) |
| ***C09J 133/06*** | (2006.01) |
| ***C09J 133/08*** | (2006.01) |
| ***C09J 133/14*** | (2006.01) |

(52) U.S. Cl.

CPC ........... *C08L 33/14* (2013.01); *C09J 133/066* (2013.01); *C09J 133/08* (2013.01); *C09J 133/14* (2013.01); *C09J 2203/318* (2013.01); *C09J 2301/122* (2020.08); *C09J 2301/312* (2020.08); *C09J 2433/00* (2013.01); *C09J 2475/00* (2013.01)

(56) References Cited

U.S. PATENT DOCUMENTS

| | | | | |
|---|---|---|---|---|
| 10,727,127 | B2 | 7/2020 | Morikazu et al. | |
| 2005/0238879 | A1 | 10/2005 | Shoshi et al. | |
| 2011/0118372 | A1* | 5/2011 | Lester | C08F 220/12 525/308 |
| 2013/0113119 | A1 | 5/2013 | Namkung et al. | |
| 2015/0315346 | A1 | 11/2015 | Lee et al. | |
| 2016/0032154 | A1 | 2/2016 | Kanno et al. | |

FOREIGN PATENT DOCUMENTS

| | | | | | |
|---|---|---|---|---|---|
| CN | 102911629 | A | | 2/2013 | |
| CN | 104250538 | A | | 12/2014 | |
| JP | 03006277 | A | * | 1/1991 | |
| JP | 2013-169322 | A | | 9/2013 | |
| JP | 2016121310 | A | * | 7/2016 | B32B 27/08 |
| JP | 2018114554 | A | | 7/2018 | |
| KR | 10-2005-0045873 | A | | 5/2005 | |
| KR | 10-2011-0135699 | A | | 12/2011 | |
| KR | 10-2015-0019247 | A | | 2/2015 | |
| KR | 10-2015-0059127 | A | | 5/2015 | |
| KR | 10-2015-0143507 | A | | 12/2015 | |
| KR | 10-2016-0078888 | A | | 7/2016 | |
| KR | 10-1756828 | B1 | | 7/2017 | |
| KR | 10-2017-0110562 | A | | 10/2017 | |
| KR | 10-2017-0135512 | A | | 12/2017 | |
| KR | 10-2018-0090734 | A | | 8/2018 | |
| TW | 200524730 | A | | 8/2005 | |
| TW | 201326356 | A | | 7/2013 | |

* cited by examiner

【FIG. 1】
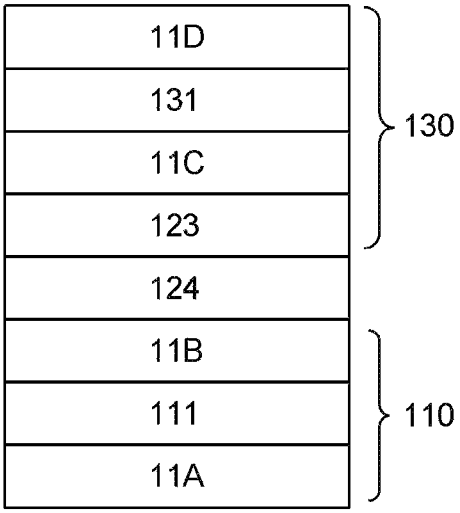
【FIG. 2】
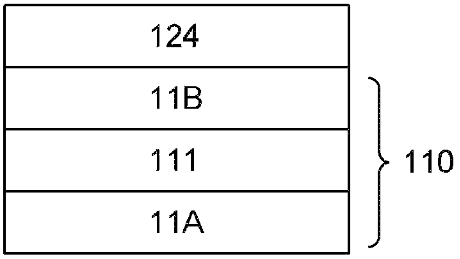
【FIG. 3】
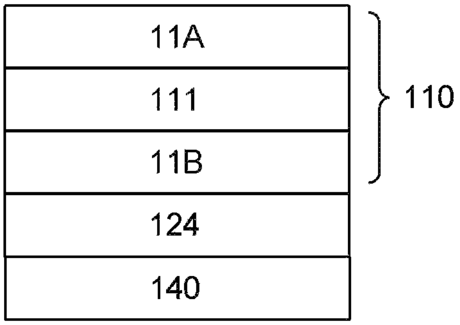

【FIG. 4】
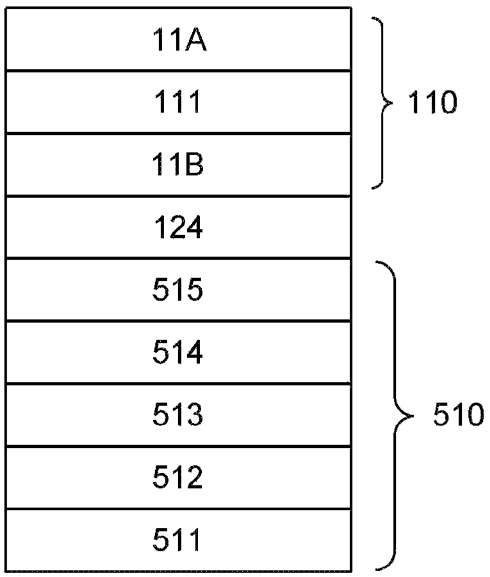

ADHESIVE AGENT COMPOSITION, SURFACE PROTECTION FILM, AND METHOD OF MANUFACTURING ORGANIC LIGHT-EMITTING ELECTRONIC DEVICE

CROSS-REFERENCE TO RELATED APPLICATIONS

This application is a National Phase entry pursuant to 35 U.S.C. § 371 of International Application No. PCT/KR2019/017078 filed on Dec. 5, 2019, and claims priority to and the benefits of Korean Patent Application No. 10-2018-0155081, filed with the Korean Intellectual Property Office on Dec. 5, 2018, the entire contents of which are incorporated herein by reference.

TECHNICAL FIELD

The present application relates to an adhesive composition, a surface protective film, and a method for manufacturing an organic light emitting electronic device using the surface protective film.

BACKGROUND ART

A plastic substrate used as a substrate material of a flexible display has a problem of significantly low gas barrier properties (moisture, oxygen and the like). In view of the above, a barrier film employing various materials and structures have been formed on the substrate in the art in order to improve problems of the plastic substrate.

However, as existing barrier films are not used any more recently, development of a surface protective film for a process capable of protecting thin film encapsulation (TFE) layer during a process for manufacturing a flexible optical device has been required. A surface protective film for a process is a film temporarily protecting a thin film encapsulation layer, and is attached to the thin film encapsulation layer during the process to prevent contamination or damage on the thin film encapsulation layer surface during the process, and removed when the process is finished.

Properties required for the surface protective film is that, first, an adhesive provided on the surface protective film needs to be well-attached on an adherend surface and needs to prevent damage on the adherend by being removed with low peel strength during the removing step. Second, adherend contamination needs to be prevented by having little adhesive residue after removing the surface protective film.

PRIOR ART DOCUMENT

Patent Document

Korean Patent No. 10-1756828

DISCLOSURE

Technical Problem

In order to reduce adhesive strength of an adhesive as a urethane-based adhesive, a plasticizer has been added to control the adhesive strength in the art. However, although low adhesive strength is obtained, adding a plasticizer causes a problem of surface contamination due to a phenomenon of the plasticizer diffusing to other materials in contact with the product surface and being lost (migration), which makes it difficult to obtain low residue properties. The present disclosure is directed to providing an adhesive layer capable of obtaining low adhesive strength and low residue amount without comprising a plasticizer.

Technical Solution

One embodiment of the present specification provides an adhesive composition comprising a urethane polymer; an acryl-based polymer; and a curing agent, wherein the acryl-based polymer comprises a (meth)acrylate monomer comprising silicone; and a (meth)acrylate monomer comprising a hydroxyl group as a monomer unit.

Another embodiment of the present specification provides an adhesive layer comprising a cured material of an acryl-based polymer; a urethane polymer; and a curing agent, wherein the acryl-based polymer comprises a (meth)acrylate monomer comprising silicone; and a (meth)acrylate monomer comprising a hydroxyl group as a monomer unit.

One embodiment of the present specification provides a surface protective film comprising a base layer comprising a base film, and a first antistatic layer and a second antistatic layer each provided on both surfaces of the base film; and an adhesive layer provided on a surface opposite to the surface provided with the base film of the second antistatic layer, wherein the adhesive layer is the adhesive layer described above.

Another embodiment of the present specification provides a method for manufacturing an organic light emitting electronic device, the method comprising attaching the adhesive layer of the surface protective film described above on an encapsulation layer of an organic light emitting device.

Advantageous Effects

The present disclosure is capable of providing an adhesive layer with, while capable of removing a surface protective film with low peel strength by having low adhesive strength for an adherend surface, a small adhesive residue amount on the adherend surface after removal and thereby having low damage or contamination on the adherend surface after detaching.

DESCRIPTION OF DRAWINGS

FIG. 1 illustrates a surface protective film formed with a base layer (110); an adhesive layer (124); and a protective layer (130).

FIG. 2 illustrates a surface protective film formed with an adhesive layer (124); and a base layer (110).

FIG. 3 illustrates a shape in which the surface protective film of FIG. 2 is attached to an adherend (140).

FIG. 4 illustrates a case in which the adherend of FIG. 3 is an organic light emitting device (510).

REFERENCE NUMERAL

11A: First Antistatic Layer
11B: Second Antistatic Layer
11C: Third Antistatic Layer
11D: Fourth Antistatic Layer
110: Base Layer
111: Base film
123: Release Layer
124: Adhesive Layer
130: Protective Layer
131: Protective Film
140: Adherend

510: Organic Light Emitting Device
511: Back Plate
512: Plastic Substrate
513: Thin Film Transistor
514: Organic Light Emitting Diode
515: Encapsulation layer

MODE FOR DISCLOSURE

Before describing the present disclosure, several terms will be defined.

In the present specification, a description of a certain part "comprising" certain constituents means capable of further comprising other constituents, and does not exclude other constituents unless particularly stated on the contrary.

In the present specification, 'p to q' means a range of 'greater than or equal to p and less than or equal to q'.

In the present specification, a (meth)acrylate comprises both an acrylate and a methacrylate.

In the present specification, a polymer comprising a monomer as a monomer unit means the monomer participating in a polymerization reaction and being included in the polymer as a repeating unit. In the present specification, a polymer comprising a monomer is interpreted in the same manner as the polymer comprising the monomer as a monomer unit.

In the present specification, it is understood that a 'polymer' is used in a broad sense comprising a copolymer unless specified as a 'homopolymer'.

In the present specification, a "unit derived from a compound" means that the corresponding compound is polymerized to form bonds in a polymer, and accordingly, all or a part of two or more substituents are eliminated in the structure of the corresponding compound, and radicals to bond to other units of the polymer may be located at the position.

In the present specification, a "monomer unit" means that the corresponding compound is polymerized to form bonds in a polymer.

In the present specification, a weight average molecular weight (Mw) and a number average molecular weight (Mn) are polystyrene converted molecular weights measured by gel permeation chromatography (GPC) while employing a monodispersed polystyrene polymer (standard sample) having various degrees of polymerization commercially available for measuring a molecular weight as a standard material. In the present specification, a molecular weight means a weight average molecular weight unless particularly described otherwise.

Embodiments of the present disclosure will be described in detail with reference to accompanying drawings so that those skilled in the art may readily implement the present disclosure. However, the present disclosure may be embodied in various different forms, and is not limited to the following descriptions.

One embodiment of the present specification provides an adhesive composition.

The adhesive composition comprises a urethane polymer; an acryl-based polymer; and a curing agent.

By comprising a urethane polymer and an acryl-based polymer, the adhesive composition according to one embodiment of the present disclosure can be peeled off from an adherend even with low peel strength, and an adhesive layer having a small residue amount on the adherend surface after peeling off the adhesive layer from the adherend can be obtained.

As the urethane polymer in one embodiment of the present disclosure, known urethane polymers can be properly selected and used within a range that does not reduce effects of the present disclosure.

In one embodiment of the present disclosure, the urethane polymer means a polymer obtained by curing a urethane composition containing a polyol and a multifunctional isocyanate compound.

As the polyol included in the urethane composition, any suitable polyol can be used as long as it is a compound comprising two or more OH groups. In one embodiment, the polyol can comprise 2 to 6 OH groups, however, the polyol is not limited thereto.

The polyol included in the urethane composition can be one, two or more types. When using two or more types of polyols, the mixing ratio can be properly selected.

A number average molecular weight of the polyol included in the urethane composition can be properly selected. In one embodiment, a number average molecular weight of the polyol can be suitably from 100 g/mol to 20,000 g/mol, but is not limited thereto.

In one embodiment, the polyol included in the urethane composition can comprise a difunctional polyol and a trifunctional polyol. In one embodiment, a ratio of the trifunctional polyol in the polyol included in the urethane composition can be from 70% by weight to 100% by weight; 80% by weight to 100% by weight; or 90% by weight to 100% by weight, and a ratio of the difunctional polyol can be from 0% by weight to 30% by weight; 0% by weight to 20% by weight; or 0% by weight to 10% by weight. In one embodiment, the polyol comprising a trifunctional polyol is advantageous in balancing adhesive strength and re-peelability of the adhesive layer.

In one embodiment, when the urethane composition comprises a trifunctional polyol, a polyol having a number average molecular weight of 10,000 g/mol to 15,000 g/mol and a polyol having a number average molecular weight of 1,000 g/mol to 5,000 g/mol can be used together as the trifunctional polyol.

In one embodiment, when the urethane composition comprises a difunctional polyol, the difunctional polyol can have a number average molecular weight of 100 g/mol to 3,000 g/mol.

The polyol included in the urethane composition preferably does not comprise an additional functional group having reactivity with the isocyanate group (NCO).

Examples of the polyol included in the urethane composition can comprise a polyacrylic polyol, a polyether polyol, a polyester polyol, a polycaprolactone polyol, a polycarbonate polyol, a castor oil-based polyol and a combination thereof, but are not limited thereto.

In one embodiment, the degree of dispersion of the molecular weight can be readily controlled when mixing two or more types of polyols. In one embodiment, the polyol comprises the polyether polyol in 50% by weight to 100% by weight; and the polyester polyol in 0% by weight to 50% by weight in the polyol. In one embodiment, the polyol comprises the polyether polyol in 75% by weight to 95% by weight; and the polyester polyol in 5% by weight to 25% by weight in the polyol.

As the isocyanate compound included in the urethane composition, any suitable multifunctional isocyanate compound commonly used in the art can be selected and used as long as it is a compound usable in a urethanization reaction.

Examples of the multifunctional isocyanate compound can comprise a multifunctional aliphatic-based isocyanate, a multifunctional alicyclic-based isocyanate, a multifunctional aromatic-based isocyanate compound, a trimethylol propane adduct obtained by modifying polyisocyanate with a trifunctional isocyanate, a biuret body obtained by reacting polyisocyanate with water, a trimer having an isocyanurate ring and the like, but are not limited thereto.

Examples of the multifunctional aliphatic-based isocyanate compound can comprise trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate and the like, but are not limited thereto.

Examples of the multifunctional alicyclic-based isocyanate compound can comprise isophorone diisocyanate (IPDI), 1,4-cyclohexane diisocyanate (CHDI), 4,4'-dicyclohexylmethane diisocyanate (HMDI), bis(isocyanatomethyl) cyclohexane (HXDI) and the like, but are not limited thereto.

Examples of the multifunctional aromatic-based isocyanate compound can comprise toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocyanate (NDI), naphthalene 2,4-diisocyanate (NDI), p-xylylene diisocyanate (XDI), 1,3-bis(1-isocyanato-1-methylethyl)benzene (TMXDI) and the like, but are not limited thereto.

In one embodiment of the present specification, two or more types of the isocyanate compounds can be mixed to the urethane composition, and herein, type and content of the two or more types of the isocyanate compounds can be properly selected. For example, as the isocyanate compound included in the urethane composition, the multifunctional aromatic-based isocyanate compound and the multifunctional aliphatic-based isocyanate compound can be mixed and used.

In the urethane composition, an OH group of the polyol and an NCO group of the isocyanate compound have an equivalence ratio (NCO group/OH group) of greater than or equal to 0.1 and less than 1. By satisfying the above-mentioned ratio, a urethane polymer formed using the urethane composition can have an OH group present therein.

In the urethane composition, a mixing ratio of the polyol and the isocyanate compound can be properly selected.

In one embodiment, the urethane composition can further comprise other components within a range that does not reduce effects of the present disclosure. For example, the urethane composition can further comprise a catalyst, a plasticizer, an antioxidant, a leveling agent, a solvent and the like.

As a polymerization method of the urethane polymer, any known proper method can be selected, and in one embodiment, a method such as solution polymerization can be used.

In one embodiment, the urethane polymer can preferably have a weight average molecular weight of 60,000 g/mol to 160,000 g/mol. When the urethane polymer has a weight average molecular weight of less than 60,000 g/mol, the urethane polymer is hard and readily broken, and the urethane polymer having a weight average molecular weight of greater than 160,000 g/mol has a problem of gelation of the urethane polymer.

In one embodiment, the urethane polymer has a hydroxyl group value of 3 mgKOH/g to 15 mgKOH/g.

In the present specification, the hydroxyl group value of a compound can be measured using a titration method. The method of measuring the hydroxyl group value using a titration method is as follows. A compound (1 g) to measure is introduced to an acetylation reagent (25.5 g), and the result is stirred for 2 hours in a 100° C. oil bath. After air cooling the result for 30 minutes, pyridine (10 ml) is introduced thereto. After that, 0.5 N KOH (50 ml, 51 g), a magnetic bar and a phenolphthalein indicator (10 drops) are introduced thereto, and the result is titrated with 0.5 N KOH until the solution turns pink while stirring on a plate.

Acetylation reagent: solution obtained by mixing anhydrous phthalic acid (70 g) and pyridine (500 g)

Phenolphthalein indicator: solution obtained by mixing undiluted phenolphthalein solution (0.5 g), ethanol (250 g) and distilled water (250 g)

The hydroxyl group value can be calculated from the following equation.

$$\text{Hydroxyl group value}=28.05\times(A-B)\times F/(\text{sample amount})$$

A: 0.5 N KOH (ml) required for blank

B: 0.5 N KOH (ml) required for the test

F: amount of KOH (ml) when titrating with 0.5 N KOH after introducing magnetic bar and phenolphthalein indicator (10 drops) to 1 N HCL (10 ml)

The acryl-based polymer comprises a (meth)acrylate monomer comprising silicone as a monomer unit. By the adhesive composition according to one embodiment of the present disclosure comprising a (meth)acrylate monomer comprising silicone; and a (meth)acrylate monomer comprising a hydroxyl group as a monomer unit, the adhesive layer can be peeled off from an adherend even with low peel strength, and an adhesive layer having a small residue amount on the adherend surface after peeling off the adhesive layer from the adherend can be obtained.

In one embodiment of the present specification, the (meth)acrylate monomer comprising silicone is a polyorganosiloxane compound comprising an acryloyloxy group.

In one embodiment of the present specification, the unit derived from the (meth)acrylate monomer comprising silicone can be represented by the following Chemical Formula 3.

[Chemical Formula 3]

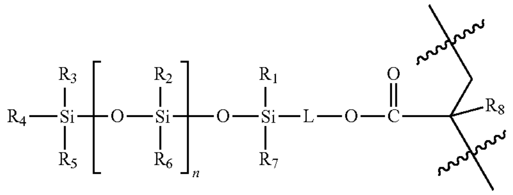

In Chemical Formula 3, $R_1$ to $R_7$ are the same as or different from each other, and each independently an alkyl group, $R_8$ is hydrogen or a methyl group, n is an integer of 0 or greater, and L is a linear or branched divalent saturated hydrocarbon group; a divalent monocyclic aliphatic saturated hydrocarbon group; a divalent polycyclic saturated hydrocarbon group; a divalent aromatic hydrocarbon group; a divalent group of a ring having cyclic saturated hydrocarbon fused to aromatic hydrocarbon; —O—; —C(=O)—; —C(=O)—O—; or —S—, or a group linking two or more of the groups.

In one embodiment of the present specification, $R_1$ to $R_7$ are the same as or different from each other, and each independently a $C_1$ to $C_{10}$ alkyl group.

In one embodiment of the present specification, Chemical Formula 3 is represented by the following Chemical Formula 3-1.

[Chemical Formula 3-1]

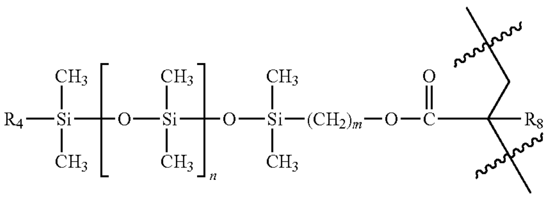

In Chemical Formula 3-1, $R_4$, $R_8$ and n have the same definitions as in Chemical Formula 3, and m is an integer of 0 to 10.

In one embodiment of the present specification, n is an integer of 1 to 500; 10 to 400; 20 to 350; or 30 to 300.

In one embodiment of the present specification, the (meth)acrylate monomer comprising silicone has a number average molecular weight of 500 g/mol to 10,000 g/mol.

In one embodiment of the present specification, the (meth)acrylate monomer comprising silicone has a number average molecular weight of 10,000 g/mol or less; 9,000 g/mol or less; or 8,000 g/mol or less. When the (meth) acrylate monomer comprising silicone has a number average molecular weight of greater than 10,000 g/mol, compatibility of the acryl-based polymer and the urethane polymer can be limited.

In one embodiment of the present specification, commercially available monomers can be used as the (meth)acrylate monomer comprising silicone. For example, X-24-8201, X-22-174DX, X-22-2426, X-22-2404, X-22-164A, X-22-164C, FA-4001, FA-4002 and FA-4003 manufactured by Shin-Etsu Chemical Co., Ltd., BY16-152D, BY16-152 and BY16-152C manufactured by Toray Dow Corning Co., Ltd., FM-0711, FM-0721 and FM-0725 manufactured by CHISSO Corporation, KP-541, KP-578, KP-543 and KP-549 manufactured by Shin-Etsu Chemical Co., Ltd., and the like can be included.

In one embodiment of the present specification, the (meth)acrylate monomer comprising silicone is included in 0.1% by weight or greater with respect to the total amount of the monomer unit included in the acryl-based polymer. When comprising the (meth)acrylate monomer comprising silicone in less than 0.1% by weight, an effect of reducing adhesive strength of the adhesive layer may be low.

In one embodiment of the present specification, the (meth)acrylate monomer comprising silicone is included in 10% by weight or less with respect to the total amount of the monomer unit included in the acryl-based polymer. When comprising the (meth)acrylate monomer comprising silicone in greater than 10% by weight, compatibility of the acryl-based polymer with the urethane polymer is low, which may cause haze in the adhesive layer.

In one embodiment of the present specification, the (meth)acrylate monomer comprising a hydroxyl group can be 2-hydroxyethyl (meth)acrylate, 2-hydroxypropyl (meth) acrylate, 2-hydroxybutyl (meth)acrylate, 4-hydroxybutyl (meth)acrylate, 6-hydroxyhexyl (meth)acrylate, polyethylene glycol (meth)acrylate, polypropylene glycol (meth)acrylate, polybutylene glycol (meth)acrylate and the like, but is not limited thereto.

In one embodiment of the present specification, the (meth)acrylate monomer comprising a hydroxyl group is an alkyl (meth)acrylate monomer substituted with one or more hydroxyl groups.

In one embodiment of the present specification, two or more types of the (meth)acrylate monomers comprising a hydroxyl group can be mixed and used as the (meth)acrylate monomer comprising a hydroxyl group. The mixing ratio is not particularly limited, and can be properly selected as necessary.

In one embodiment of the present specification, the (meth)acrylate monomer comprising a hydroxyl group is included in 1% by weight or greater with respect to the total amount of the monomer unit included in the acryl-based polymer.

In one embodiment of the present specification, the (meth)acrylate monomer comprising a hydroxyl group is included in 20% by weight or less with respect to the total amount of the monomer unit included in the acryl-based polymer. When comprising the (meth)acrylate monomer comprising a hydroxyl group in greater than 20% by weight, compatibility of the acryl-based polymer with the urethane polymer is low, which may cause haze in the adhesive layer.

In one embodiment of the present specification, the acryl-based polymer can comprise, in addition to the (meth) acrylate monomer comprising silicone, other monomer components (other monomers) polymerizable with the (meth) acrylate monomer in a range that does not reduce effects of the present disclosure.

In one embodiment of the present specification, the acryl-based polymer can further comprise a (meth)acrylate monomer such as an alkyl (meth)acrylate having less than 8 carbon atoms, cyclohexyl (meth)acrylate or an aromatic (meth)acrylate, but is not limited thereto.

Examples of the alkyl (meth)acrylate having less than 8 carbon atoms can comprise methyl (meth)acrylate, ethyl (meth)acrylate, n-propyl (meth)acrylate, isopropyl (meth) acrylate, n-butyl (meth)acrylate, t-butyl (meth)acrylate, sec-butyl (meth)acrylate, pentyl (meth)acrylate, 2-ethylbutyl (meth)acrylate and the like, but are not limited thereto.

Examples of the aromatic (meth)acrylate can comprise ortho-biphenyl (meth)acrylate, meta-biphenyl (meth)acrylate, para-biphenyl (meth)acrylate, 2,6-terphenyl (meth) acrylate, ortho-terphenyl (meth)acrylate, meta-terphenyl (meth)acrylate, para-terphenyl (meth)acrylate, 4-(4-methylphenyl)phenyl (meth)acrylate, 4-(2-methylphenyl)phenyl (meth)acrylate, 2-(4-methylphenyl)phenyl (meth)acrylate, 2-(2-methylphenyl)phenyl (meth)acrylate, 4-(4-ethylphenyl)phenyl (meth)acrylate, 4-(2-ethylphenyl)phenyl (meth) acrylate, 2-(4-ethylphenyl)phenyl (meth)acrylate, 2-(2-ethylphenyl)phenyl (meth)acrylate and the like, but are not limited thereto.

Examples of the other (meth)acrylate monomers that can be included in the acryl-based polymer can comprise cyclohexyl (meth)acrylate, phenoxy (meth)acrylate, 2-ethylphenoxy (meth)acrylate, benzyl (meth)acrylate, phenyl (meth) acrylate, 2-ethylthiophenyl (meth)acrylate, 2-phenylethyl (meth)acrylate, 3-phenylpropyl (meth)acrylate, 4-phenylbutyl (meth)acrylate, 2,2-methylphenylethyl (meth)acrylate, 2,3-methylphenylethyl (meth)acrylate, 2,4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)

ethyl (meth)acrylate, 2-(3-chlorophenyl)ethyl (meth) acrylate, 2-(4-chlorophenyl)ethyl (meth)acrylate, 2-(4-bromophenyl)ethyl (meth)acrylate, 2-(3-phenylphenyl)ethyl (meth)acrylate, 2-(4-benzylphenyl)ethyl (meth)acrylate and the like, but are not limited thereto.

In one embodiment, the acryl-based polymer is a random polymer of the alkyl (meth)acrylate monomer having less than 8 carbon atoms; the (meth)acrylate monomer comprising silicone; and the (meth)acrylate monomer comprising a hydroxyl group.

In the present specification, the alkyl (meth)acrylate means $CH_2CR_{31}COOR_{32}$, wherein $R_{31}$ means hydrogen; or a methyl group, and $R_{32}$ means an alkyl group. In one embodiment, the alkyl (meth)acrylate having less than 8 carbon atoms means the number of carbon atoms of $R_{32}$ being less than 8.

In one embodiment, the acryl-based polymer is a random polymer of 70% by weight to 98.9% by weight of the alkyl (meth)acrylate monomer having less than 8 carbon atoms; 0.1% by weight to 10% by weight of the (meth)acrylate monomer comprising silicone; and 1% by weight to 20% by weight of the (meth)acrylate monomer comprising a hydroxyl group.

In one embodiment of the present specification, the acryl-based polymer can be polymerized using various generally used polymerization methods such as solution polymerization, peracid polymerization, suspension polymerization, emulsion polymerization and radiation curing polymerization.

In the present specification, the acryl-based polymer can be a random copolymer having a form in which monomers are mixed with each other without order, a block copolymer in which blocks arranged by a certain section are repeated, or an alternating copolymer having a form in which monomers are alternately repeated and polymerized.

In one embodiment, the acryl-based polymer has a hydroxyl group value of 5 mgKOH/g to 40 mgKOH/g. When the acryl-based polymer has a hydroxyl group value greater than the above-mentioned range, the adhesive layer may become hard after curing, and therefore, satisfying the above-mentioned range is preferred.

In one embodiment of the present specification, the acryl-based polymer has a weight average molecular weight of 10,000 g/mol or greater; 15,000 g/mol or greater; or 20,000 g/mol or greater.

In one embodiment of the present specification, the acryl-based polymer has a weight average molecular weight of 60,000 g/mol or less; 55,000 g/mol or less; 50,000 g/mol or less; or 40,000 g/mol or less.

When the acryl-based polymer has a molecular weight of less than 10,000 g/mol, the adhesive migrates from the adhesive layer to an adherend surface causing a problem of contamination or the like, and when the acryl-based polymer has a molecular weight of 60,000 g/mol or less, compatibility with the urethane polymer is secured minimizing an occurrence of haze in the adhesive layer, and therefore, satisfying the above-mentioned range is preferred.

In one embodiment of the present specification, the curing agent is an isocyanate-based curing agent.

In one embodiment of the present specification, the isocyanate-based curing agent can be selected from among diisocyanate compound oligomers, polymers, cyclic monomers, or common aliphatic or aromatic diisocyanate compounds, or commercialized diisocyanate compound oligomers and the like can be purchased and used.

In one embodiment of the present specification, as the isocyanate-based curing agent, an aromatic cyclic diisocyanate compound having a benzene ring such as 2,4- or 2,6-toluene diisocyanate (TDI), 4,4'-diphenylmethane diisocyanate (MDI), xylene diisocyanate (XDI) or 1,5-naphthalene diisocyanate; an aliphatic noncyclic diisocyanate such as hexamethylene diisocyanate (HDI), propylene diisocyanate, lysine diisocyanate, or 2,2,4- or 2,4,4-trimethylhexamethylene diisocyanate; an aliphatic cyclic diisocyanate compound such as 1,4-cyclohexane diisocyanate, isophorone diisocyanate (IPDI) or 4,4'-dicyclohexylmethane diisocyanate (H12MDI); and a combination thereof can be used, however, the isocyanate-based curing agent is not limited thereto.

In one embodiment of the present specification, the isocyanate-based curing agent comprises one or more types of aliphatic cyclic isocyanate compounds and aliphatic noncyclic isocyanate compounds.

In one embodiment of the present specification, two or more types of the isocyanate-based curing agents can be mixed and used as the adhesive composition, and the ratio can be properly selected.

In one embodiment of the present specification, the adhesive composition further comprises a solvent. As the solvent, proper known solvents such as ketone-based, acetate-based and toluene-based can be used, however, the solvent is not limited thereto.

In one embodiment of the present specification, the adhesive composition further comprises a catalyst. The catalyst can be properly selected considering purposes of the present application, and for example, can be included in 10 ppm to 500 ppm with respect to the urethane polymer.

As the catalyst, tin-based catalysts such as dibutyl tin dilaurate (DBTDL), lead-based catalysts, organic and inorganic acid salts, organic metal derivatives, amine-based catalysts, diazabicycloundecene-based catalysts and the like can be used, however, the catalyst is not limited thereto.

In one embodiment of the present specification, the adhesive composition can further comprise a curing retarder. As the curing retarder, any known suitable material can be used, and a content of the curing retarder can be properly selected. In one embodiment, acetylacetone can be used as the curing retarder.

In one embodiment of the present specification, the adhesive composition can further comprise various general additives.

In one embodiment of the present specification, the acryl-based polymer is included in 1 parts by weight or greater; or 3 parts by weight with respect to 100 parts by weight of the urethane polymer.

In one embodiment of the present specification, the acryl-based polymer is included in 10 parts by weight or less with respect to 100 parts by weight of the urethane polymer.

When the acryl-based polymer is included in less than the above-mentioned range, an effect of reducing adhesive strength of the adhesive layer can be insignificant, and comprising the acryl-based polymer in greater than the above-mentioned range may cause haze in the adhesive layer, and therefore, satisfying the above-mentioned range is preferred.

In one embodiment of the present specification, the curing agent is included in 25 parts by weight or less; or 20 parts by weight or less with respect to 100 parts by weight of the urethane polymer.

When comprising the curing agent in greater than the above-mentioned range, the isocyanate group remains in the formed adhesive layer causing a problem of increasing adhesive strength, and when the curing agent is included in less than the above-mentioned range, the crosslinking reaction is not sufficient, and adhesive strength of the adhesive layer may increase at a high temperature.

The present specification also provides an adhesive layer comprising a cured material of a urethane polymer; an acryl-based polymer; and a curing agent, wherein the acryl-based polymer comprises a (meth) acrylate monomer comprising silicone; and a (meth)acrylate monomer comprising a hydroxyl group as a monomer unit.

As for the urethane polymer; the acryl-based polymer; and the curing agent included in the adhesive layer, descriptions on the acryl-based polymer included in the adhesive composition can be applied in the same manner.

In one embodiment of the present specification, the acryl-based polymer included in the adhesive layer further comprises an alkyl (meth)acrylate monomer having less than 8 carbon atoms.

In one embodiment, the curing agent is an isocyanate-based curing agent, and the cured material of the acryl-based polymer; the urethane polymer; and the curing agent is a material formed by all or a part of the OH group of the urethane polymer and all or a part of the OH group of the acryl-based polymer going through an OH—NCO crosslinking reaction with the NCO of the curing agent. Herein, the OH—NCO crosslinking reaction means a reaction in which the —OH group and the —NCO group react to form an —O—C(=O)—NH— group.

By the urethane polymer and the acryl-based polymer being crosslinked by the curing agent, the adhesive layer can be peeled off from an adherend even with lower peel strength, and an adhesive layer having a small residue amount on the adherend surface after peeling off the adhesive layer from the adherend can be obtained.

One embodiment of the present specification provides a surface protective film comprising a base layer comprising a base film, and a first antistatic layer and a second antistatic layer each provided on both surfaces of the base film; and an adhesive layer provided on a surface opposite to the surface provided with the base film of the second antistatic layer, wherein the adhesive layer comprises a cured material of a urethane polymer; an acryl-based polymer; and a curing agent, and the acryl-based polymer comprises a (meth)acrylate monomer comprising silicone; and a (meth)acrylate monomer comprising a hydroxyl group as a monomer unit.

One embodiment of the present specification provides a surface protective film comprising a base layer comprising a base film, and a first antistatic layer and a second antistatic layer each provided on both surfaces of the base film; and an adhesive layer provided on a surface opposite to the surface provided with the base film of the second antistatic layer, wherein the adhesive layer comprises a cured material of the adhesive composition described above.

In one embodiment of the present specification, the surface protective film further comprises a protective layer comprising a protective film, a third antistatic layer and a fourth antistatic layer each provided on both surfaces of the protective film, and a release layer provided on a surface opposite to the surface provided with the protective film of the third antistatic layer, wherein the protective layer can be provided so that the release layer faces the adhesive layer.

FIG. 1 is a sectional diagram of the surface protective film according to one embodiment of the present disclosure. The surface protective film illustrated in FIG. 1 is provided with a first antistatic layer (11A), a base film (111), a second antistatic layer (11B), an adhesive layer (124), a release layer (123), a third antistatic layer (11C), a protective film (131) and a fourth antistatic layer (11D) in this order.

In one embodiment, the surface protective film is a surface protective film for protecting a surface of an organic light emitting device during a manufacturing process of an organic light emitting electronic device.

By the adhesive layer according to one embodiment of the present disclosure being provided on one surface of the second antistatic layer, the amount of accumulated static electricity can be reduced. In addition, since surface resistance of the adhesive layer is reduced, generation of static electricity on the adhesive layer surface is reduced when peeling off the protective layer from the surface protective film.

Accordingly, when removing the protective layer from the surface protective film in order to attach the adhesive layer to an adherend surface, or when peeling off the surface protective film from an adherend surface, foreign substances that can be attached to the adhesive layer or the adherend by static electricity can be prevented. In addition, decline in the properties of the adherend surface can be prevented by preventing contamination on the adherend surface during the process.

In one embodiment, the surface protective film can be used by removing the protective layer from the surface protective film, and attaching the adhesive layer to a surface of a device to protect. FIG. 2 is a case in which the protective layer is removed from the surface protective film of FIG. 1.

When referring to FIG. 2, the protective layer-removed surface protective film comprises a first antistatic layer (11A), a base film (111), a second antistatic layer (11B) and an adhesive layer (124) in this order.

FIG. 3 illustrates a form in which the surface protective film of FIG. 2 is attached to an adherend (140) surface in order to protect the adherend surface.

In the present specification, the adherend means a material to which the adhesive layer can adhere. In one embodiment, the adherend comprises an encapsulation layer of an organic light emitting device and a plastic substrate used in the device, but is not limited thereto.

Types of the base film are not particularly limited. Examples of the base film can comprise a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, a polyimide film or the like, but are not limited thereto. In one embodiment of the present disclosure, the base film can be a polyethylene terephthalate (PET) film.

A thickness of the base film can be properly selected considering purposes of the present application. For example, the base film thickness can be greater than or equal to 25 μm and less than or equal to 150 μm; greater than or equal to 50 μm and less than or equal to 125 μm; or greater than or equal to 50 μm and less than or equal to 100 μm. When the base film thickness is less than the above-mentioned thickness range in bonding the surface protective film to an encapsulation layer of an organic light emitting device, the base film may be readily deformed, and when the base film thickness is greater than the above-mentioned thickness range, bonding defects may occur.

The base film can have proper adhesion treatment such as corona discharge treatment, ultraviolet irradiation treatment, plasma treatment or sputter etching treatment performed thereon, but is not limited thereto.

In one embodiment, the base film can be directly attached to the first and/or the second antistatic layers. In another embodiment, when the base film is surface treated, the first and/or the second antistatic layers can be attached to the surface-treated base film.

The term 'antistatic layer' in the present specification means a layer for the purpose of suppressing generation of static electricity.

The first to the fourth antistatic layers can be formed using known methods to achieve target effects. For example, the first to the fourth antistatic layers can be formed on both surfaces of the base film and both surfaces of the protective film using an inline coating method.

In the present disclosure, the first to the fourth antistatic layers can be formed using a proper antistatic composition considering purposes of the present application. For example, the first to the fourth antistatic layers can comprise one selected from the group consisting of acryl-based resins, urethane-based resins, urethane-acryl-based copolymers, ester-based resins, ether-based resins, amide-based resins, epoxy-based resins and melamine resins, or a mixture thereof, but are not limited thereto.

In one example, the first to the fourth antistatic layers can comprise a conductive material. The conductive material can comprise a conductive polymer or carbon nanotubes, but is not limited thereto.

The conductive polymer can be formed with, for example, polyaniline-, polypyrrole-, polythiophene-based, derivatives and copolymers thereof, but is not limited thereto.

The carbon nanotube can have a tube shape formed by rounding a graphite plate shape formed by connecting a hexagonal ring made with 6 carbons to each other. The carbon nanotube has excellent rigidity and electrical conductivity, and when used as the antistatic layer of the surface protective film, hardness of the antistatic layer increases, and an antistatic function can be enhanced.

Thicknesses of the first to the fourth antistatic layers can be properly selected considering purposes of the present application, and the thicknesses of the antistatic layers can be the same as or different from each other.

In one embodiment, the thicknesses of the first to the fourth antistatic layers can be each independently greater than or equal to 10 nm and less than 400 nm, and can be preferably greater than or equal to 20 nm and less than or equal to 300 nm; or greater than or equal to 20 nm and less than or equal to 100 nm. By the first to the fourth antistatic layers having thicknesses in the above-described range, excellent coatability can be obtained on both surfaces of the base film or both surfaces of the protective film.

In one embodiment, surface resistance of the first to the fourth antistatic layers can be properly selected considering purposes of the present application. For example, the surface resistance of the first to the fourth antistatic layers can be each independently $10^4$ Ω/sq or greater; $10^5$ Ω/sq or greater; $10^6$ Ω/sq or greater; $10^7$ Ω/sq or greater; $10^8$ Ω/sq or greater; or $10^9$ Ω/sq or greater. For example, the surface resistance of the first to the fourth antistatic layers can be each independently $5\times10^{12}$ Ω/sq or less; or $10^{11}$ Ω/sq or less. When the first to the fourth antistatic layers have surface resistance in the above-described range, the surface protective film can have an excellent antistatic function.

In one embodiment, the first and the second antistatic layers are each in direct contact with both surfaces of the base film. In one embodiment, the third and the fourth antistatic layers are each in direct contact with both surfaces of the protective film.

In the present disclosure, a thickness of the adhesive layer can be properly selected considering purposes of the present application. For example, the adhesive layer thickness can be 10 μm or greater; 30 μm or greater; or 45 μm or greater. For example, the adhesive layer thickness can be 200 μm or less; 150 μm or less; 100 μm or less; or 90 μm or less.

By the adhesive layer having a thickness in the above-mentioned range, adhesiveness and wettability of the adhesive layer for an adherend surface can be enhanced.

In the present disclosure, the protective layer comprises a protective film; and a third antistatic layer and a fourth antistatic layer each provided on both surfaces of the protective film. A release layer is provided on a surface opposite to the surface provided with the protective film of the third antistatic layer.

The protective film can comprise one or more selected from the group consisting of, for example, polyethylene terephthalate; polytetrafluoroethylene; polyethylene; polypropylene; polybutene; polybutadiene; a vinyl chloride copolymer; polyurethane; ethylene-vinyl acetate; an ethylene-propylene copolymer; an ethylene-ethyl acrylate copolymer; an ethylene-methyl acrylate copolymer; polyimide; nylon; a styrene resin or elastomer; a polyolefin-based resin or elastomer; other elastomers; a polyoxyalkylene-based resin or elastomer; a polyester-based resin or elastomer; a polyvinyl chloride-based resin or elastomer; a polycarbonate-based resin or elastomer; a polyphenylene sulfide-based resin or elastomer; a mixture of hydrocarbon; a polyamide-based resin or elastomer; an acrylate-based resin or elastomer; an epoxy-based resin or elastomer; a silicone-based resin or elastomer; and a liquid crystal polymer, but is not limited thereto.

A thickness of the protective film can be properly selected considering purposes of the present application. For example, the protective film thickness can be greater than or equal to 25 μm and less than or equal to 150 μm; greater than or equal to 25 μm and less than or equal to 125 μm; or greater than or equal to 25 μm and less than or equal to 100 μm. When the protective film thickness is less than the above-mentioned thickness range, the protective film can be readily deformed when bonding the adhesive layer-formed surface protective film to an encapsulation layer of an organic light emitting device, and when the protective film thickness is greater than the above-mentioned thickness range, bonding defects can occur.

A material of the release layer can be properly selected according to purposes of the present disclosure. Examples of the release layer material can comprise a silicone-based release agent, a fluorine-based release agent, a long-chain alkyl-based release agent, a fatty acid amide-based release agent and the like, but are not limited thereto. In one embodiment, a silicone-based release agent can be used as the release layer material.

As the silicone-based release agent, an addition reaction-type silicone polymer can be used, for example.

The release layer can be formed by, for example, coating the release layer material on a protective layer, and drying the result. As methods of coating and drying the release layer material, any suitable coating method can be properly used.

A thickness of the release layer can be properly selected considering purposes of the present application. For example, the release layer thickness can be greater than or equal to 10 nm and less than or equal to 500 nm; greater than or equal to 10 nm and less than or equal to 300 nm; or greater than or equal to 10 nm and less than or equal to 200 nm. When the release layer does not have the thickness described above, film defects can occur during the process, and therefore, having the above-mentioned thickness is preferred.

In the present specification, unless particularly limited otherwise, 'glass' may mean alkali-free glass (Nippon Electric Glass Co., Ltd., OA-21).

In the surface protective film according to one embodiment of the present specification, peel strength when peeling off the surface opposite to the surface provided with the base layer of the adhesive layer from glass at a peeling rate of 1.8 m/min and a peeling angle of 180° is 0.5 gf/in or greater.

In the surface protective film according to one embodiment of the present specification, peel strength when peeling off the surface opposite to the surface provided with the base layer of the adhesive layer from glass at a peeling rate of 1.8 m/min and a peeling angle of 180° is 10 gf/in or less; 3.5 gf/in or less; 3 gf/in or less; or 2.5 gf/in or less.

In one embodiment, the peel strength when peeling off the surface opposite to the surface provided with the base layer of the adhesive layer from glass at a peeling rate of 1.8 m/min and a peeling angle of 180° is peel strength obtained by cutting the surface protective film to a width of 25 mm and a length of 150 mm, attaching the adhesive layer of the surface protective film to glass using a 2 kg roller, storing the result for 24 hours under a temperature of 25° C. and relative humidity of 50%, and, using a texture analyzer (manufactured by Stable Micro Systems, UK), peeling off the surface protective film from the glass at a peeling rate of 1.8 m/min and a peeling angle of 180°.

In one embodiment, the peel strength when peeling off the surface protective film from the glass at a peeling rate of 1.8 m/min and a peeling angle of 180° is a value measured under a temperature of 25° C. and relative humidity of 50%.

In the surface protective film according to one embodiment of the present specification, a residual rate of the surface opposite to the surface provided with the base layer of the adhesive layer is 80% or greater; 85% or greater; or 87% or greater.

In the surface protective film according to one embodiment of the present specification, a residual rate of the surface opposite to the surface provided with the base layer of the adhesive layer is 100% or less. A residual rate being 100% means having no residue amount of the adhesive layer.

In one embodiment of the present specification, the residual rate of the surface opposite to the surface provided with the base layer of the adhesive layer can be obtained by calculating a formula of the following Chemical Formula (4) after preparing an adhesive (Ref.) having peel strength of 1,800±100 gf/in when peeled off from glass at a peeling rate of 1.8 m/min and a peeling angle of 180°, and measuring adhesive strength (A) and adhesive strength (B) as follows, the adhesive strength (B) is peel strength obtained by attaching the adhesive layer of the surface protective film to glass, storing the result for 10 days under a condition of a temperature of 60° C. and relative humidity of 90%, removing the surface protective film from the glass, attaching the adhesive (Ref.) on the surface protective film-removed glass surface, and peeling off the adhesive (Ref.) from the glass at a peeling rate of 1.8 m/min and a peeling angle of 180°, and the adhesive strength (A) is peel strength obtained by peeling off the adhesive (Ref.) from glass at a peeling rate of 1.8 m/min and a peeling angle of 180°.

$$\text{Residual rate (\%)}=(\text{adhesive strength } (B)/\text{adhesive strength } (A))\times 100 \quad \text{[Chemical Formula 4]}$$

In one embodiment, as the adhesive (Ref.) having peel strength of 1,800±100 gf/in when peeled off from glass at a peeling rate of 1.8 m/min and a peeling angle of 180°, a 9002D product manufactured by LG Chem., and the like can be used, however, the adhesive (Ref.) is not limited thereto.

Another embodiment of the present specification provides a method for preparing a surface protective film. The preparation method relates to, for example, a method for preparing the surface protective film described above. Accordingly, as for a surface protective film formed using the method for preparing a surface protective film to describe below, the descriptions on the surface protective film provided above can be applied in the same manner.

In one example, the method for preparing a surface protective film can comprise forming a base layer comprising a base film, and a first antistatic layer and a second antistatic layer each provided on both surfaces of the base film; forming a protective layer comprising a protective film, a third antistatic layer and a fourth antistatic layer each provided on both surfaces of the protective film, and a release layer provided on a surface opposite to the surface provided with the protective film of the third antistatic layer; and bonding the base layer and the protective layer by an adhesive layer so that the second antistatic layer and the release layer face each other.

In one embodiment, the method for preparing a surface protective film can further comprise forming the adhesive layer on one surface of the second antistatic layer of the base layer prior to the bonding of the base layer and the protective layer by the adhesive layer. In this case, the bonding of the base layer and the protective layer can be bonding the base layer and the protective layer so that the adhesive layer and the release layer face each other.

The forming of an adhesive layer on one surface of the second antistatic layer of the base layer comprises coating the adhesive composition on a surface opposite to the surface provided with the base film of the second antistatic layer; and curing the coated adhesive composition.

As a method of coating the adhesive composition, known coating methods such as a reverse coating method, a gravure coating method, a spin coating method, a screen coating method, a fountain coating method, a dipping method and a spray method can be used, however, the method is not limited thereto.

Curing of the coated adhesive composition can be conducted at a proper temperature and for a proper time. In one embodiment, the coated adhesive composition can be cured through aging for approximately 3 days in a 40° C. oven, however, the curing is not limited thereto.

In one embodiment, the surface protective film comprising a base layer comprising a base film, and a first antistatic layer and a second antistatic layer each provided on both surfaces of the base film; and an adhesive layer provided on a surface opposite to the surface provided with the base film of the second antistatic layer can be prepared by peeling off the protective layer from the surface protective film comprising the protective layer and the release layer described above.

One embodiment of the present specification provides a method for manufacturing an organic light emitting electronic device.

In one embodiment of the present specification, the method for manufacturing an organic light emitting electronic device comprises attaching the adhesive layer of the surface protective film described above on an encapsulation layer of an organic light emitting device.

In one embodiment, when the surface protective film further comprises a protective layer, the method for manufacturing an organic light emitting electronic device further comprises removing the protective layer from the surface protective film prior to the attaching of the adhesive layer on an encapsulation layer.

In one embodiment of the present specification, the organic light emitting device comprises a back plate, a plastic substrate, a thin film transistor, an organic light emitting diode and an encapsulation layer in this order.

FIG. 4 illustrates a case in which the surface protective film according to one embodiment of the present disclosure is attached on an encapsulation layer during the process of manufacturing an organic light emitting electronic device. When referring to FIG. 4, the surface protective film of FIG. 2 according to one embodiment of the present disclosure is attached on an encapsulation layer (515) of an organic light emitting device (510) comprising a back plate (511), a plastic substrate (512), a thin film transistor (513), an organic light emitting diode (514) and an encapsulation layer (515) in this order so that the adhesive layer and the encapsulation layer face each other.

The encapsulation layer can exhibit excellent moisture barrier properties and optical properties in the organic light emitting electronic device. In addition, the encapsulation layer can be formed as a stable encapsulation layer regardless of a type of the organic light emitting electronic device such as top emission or bottom emission.

In one embodiment, the encapsulation layer can comprise a single-layered or multilayered inorganic material layer. As a method of forming the encapsulation layer, common methods of forming an encapsulation layer known in the art can be used.

Examples of the single-layered or multilayered inorganic material layer can comprise aluminum oxide-based, silicon nitride-based, silicon oxynitride-based and the like.

The method for manufacturing an organic light emitting electronic device of the present application can further comprise peeling off the surface protective film from the encapsulation layer; and laminating a touch screen panel and a cover window on the encapsulation layer. The surface protective film has an excellent antistatic function for the encapsulation layer when peeled off from the encapsulation layer, which prevents attachment of foreign substances between the encapsulation layer and the touch screen when bonding the touch screen panel on the encapsulation layer, and thereby prevents device defects.

Hereinafter, the present application will be described in more detail through examples that follow the present application and comparative examples that do not follow the present application, however, the scope of the present application is not limited by the examples provided below.

Preparation Example 1—Preparation of Adhesive Composition 1

<Preparation of Urethane Polymer>

To a 3-neck flask filled with nitrogen gas, 80 parts by weight of trifunctional preminol (polyether polyol, S 4013F, ASAHI GLASS CO. LTD., Mn=12,000 g/mol), 5 parts by weight of difunctional polyol (polypropylene glycol, PPG-1000d, KUMHO PETROCHEMICAL, Mn=1,000 g/mol), 15 parts by weight trifunctional MPD/TMPT-based polyol (mixture of MPD (3-methyl-1,5-pentanediol) and TMPT (trimethylol propane adipate), Polyol F-3010, Kuraray Co., Ltd., Mn=3,000 g/mol) and ethyl acetate were introduced, and stirred at a high rate for 15 minutes under a catalyst (DBTDL). Then, 18 parts by weight of a multifunctional alicyclic isocyanate compound (MHG-80B, ASAHI KASEI Corporation) with respect to 100 parts by weight of the preminol, the polyol and the MPD/TMPT-based polyol was slowly added dropwise thereto while heating, and the result was kept for 3 hours at 90±5° C. and reacted until the isocyanate (NCO) peak disappeared to prepare a urethane polymer having a weight average molecular weight of 110,000 g/mol.

<Preparation of Acryl-Based Polymer (D1)>

To a 1 L reactor having nitrogen gas refluxed therein and equipped with a cooling device so as to readily control a temperature, a monomer mixture formed with 90 parts by weight of butyl methacrylate (BMA), 5 parts by weight of acrylate comprising silicone FM-0721 (CHISSO Corporation, Mn=5,000 g/mol) and 5 parts by weight of 2-hydroxybutyl acrylate (2-HBA) was introduced, and ethyl acetate was introduced thereto as a solvent. Then, the reactor was purged with nitrogen gas for approximately 1 hour to remove oxygen, and the reactor temperature was maintained at 62° C. After homogenizing the mixture, 400 ppm of azobisisobutylnitrile (AIBN) as a reaction initiator and 400 ppm of n-dodecyl mercaptan (n-DDM) as a chain transfer agent were introduced thereto, and the mixture was reacted. After the reaction, the result was diluted with toluene to prepare an acryl-based polymer (D1) having a weight average molecular weight of 34,000 g/mol.

FM-0721

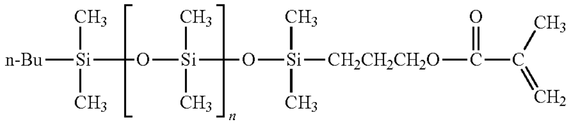

<Preparation of Adhesive Composition 1>

The prepared urethane polymer, 15 parts by weight of an HDI trimer-based curing agent (TKA-100, ASAHI KASEI Corporation), 5 parts by weight of the acryl-based polymer (D1), 0.005 parts by weight of a catalyst (DBTDL) and 3 parts by weight of a curing retarder (acetylacetone) with respect to 100 parts by weight of the urethane polymer were mixed, a toluene solvent was introduced thereto so that the solid concentration became 48 wt %, and the result was stirred using a disper to prepare Adhesive Composition 1.

TKA-100

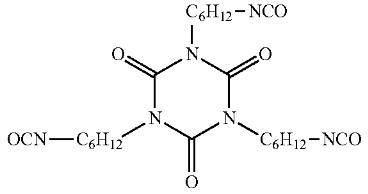

Preparation Example 2—Preparation of Adhesive Composition 2

An acryl-based polymer (D2) having a molecular weight of 36,000 g/mol was prepared in the same manner as in the preparation of the acryl-based polymer (D1) except that the BMA/FM-0721/2-HBA had a weight ratio of 85:5:10 instead of 90:5:5.

Adhesive Composition 2 was prepared in the same manner as in the preparation of the Adhesive Composition 1 except that the acryl-based polymer (D2) was used instead of the acryl-based polymer (D1).

Preparation Example 3—Preparation of Adhesive Composition 3

An acryl-based polymer (D3) having a molecular weight of 29,000 g/mol was prepared in the same manner as in the preparation of the acryl-based polymer (D1) except that the BMA/FM-0721/2-HBA had a weight ratio of 86:9:5 instead of 90:5:5.

Adhesive Composition 3 was prepared in the same manner as in the preparation of Adhesive Composition 1 except that the acryl-based polymer (D3) was used instead of the acryl-based polymer (D1).

Preparation Example 4—Preparation of Adhesive Composition 4

An acryl-based polymer (D4) having a molecular weight of 26,000 g/mol was prepared in the same manner as in the preparation of the acryl-based polymer (D1) except that the BMA/FM-0721/2-HBA had a weight ratio of 81:9:10 instead of 90:5:5.

Adhesive Composition 4 was prepared in the same manner as in the preparation of Adhesive Composition 1 except that the acryl-based polymer (D4) was used instead of the acryl-based polymer (D1).

Preparation Example 5—Preparation of Adhesive Composition 5

An acryl-based polymer (D5) having a molecular weight of 30,000 g/mol was prepared in the same manner as in the preparation of the acryl-based polymer (D1) except that the BMA/FM-0721/2-HBA had a weight ratio of 80:5:15 instead of 90:5:5.

Adhesive Composition 5 was prepared in the same manner as in the preparation of Adhesive Composition 1 except that the acryl-based polymer (D5) was used instead of the acryl-based polymer (D1).

Comparative Preparation Example 1—Preparation of Comparative Composition 1

Comparative Composition 1 was prepared in the same manner as in the preparation of Adhesive Composition 1 except that the acryl-based polymer (D1) was not used.

Comparative Preparation Example 2—Preparation of Comparative Composition 2

Comparative Composition 2 was prepared in the same manner as in the preparation of Adhesive Composition 1 except that, instead of the acryl-based polymer (D1), isopropyl myristate (IPMS) was used in 20 parts by weight with respect to 100 parts by weight of the urethane polymer.

Comparative Preparation Example 3—Preparation of Comparative Composition 3

Comparative Composition 3 was prepared in the same manner as in the preparation of Adhesive Composition 1 except that, instead of the acryl-based polymer (D1), isopropyl myristate (IPMS) was used in 40 parts by weight with respect to 100 parts by weight of the urethane polymer.

Comparative Preparation Example 4—Preparation of Comparative Composition 4

An acryl-based polymer (E1) having a weight average molecular weight of 32,000 g/mol was prepared in the same manner as in the preparation of the acryl-based polymer (D1) except that BMA was used in 100 parts by weight instead of BMA/FM-0721/2-HBA.

Comparative Preparation Example 5—Preparation of Comparative Composition 5

An acryl-based polymer (D6) having a weight average molecular weight of 28,000 g/mol was prepared in the same manner as in the preparation of the acryl-based polymer (D1) except that BMA/FM-0721 were used in a weight ratio of 80:20 instead of BMA/FM-0721/2-HBA.

Comparative Composition 5 was prepared in the same manner as in the preparation of Adhesive Composition 1 except that the acryl-based polymer (D6) was used instead of the acryl-based polymer (D1).

Preparation of Surface Protective Film

A polyethylene terephthalate (PET) film (H330, KOLON) with a thickness of 75 μm having an antistatic layer with a thickness of 50 nm coated on both surfaces of a base film was prepared as a base layer. As a protective layer, a film (12ASW, SKC Corporation) in which an antistatic layer is formed on both surfaces of a polyethylene terephthalate (PET) film (XD510P, Toray Advanced Materials Korea Inc.) having a thickness of 50 μm, and a release layer is coated on one of the antistatic layers was prepared. Then, the adhesive composition was comma coated on one surface of the base layer to a thickness of 75 μm, and after hot air drying the result, the release-coated protective layer was laminated on the adhesive composition so that the base layer and the release layer face each other, and the result was aged for 5 days at 40° C. to prepare a surface protective film.

Surface protective films of Examples 1 to 5 and Comparative Examples 1 to 4 were prepared in the same manner as in the preparation method of the surface protective film except that Adhesive Compositions 1 to 5 and Comparative Compositions 1 to 4 were respectively used as the adhesive composition. The following Table 1 shortly compares constitutions of Examples 1 to 5 and Comparative Examples 1 to 4.

Properties of the adhesive layer in each of the examples and the comparative examples of the present application were evaluated in the following manners, and the results are shown in the following Table 2.

Measurement of Pool Strength

The surface protective film of each of Examples 1 to 5 and Comparative Examples 1 to 4 was cut to a width of 25 mm and a length of 150 mm. Subsequently, the adhesive layer of the surface protective film was attached to glass using a 2 kg roller, and the result was stored for approximately 24 hours at room temperature. Then, using a texture analyzer (manufactured by Stable Micro Systems, UK), low rate peel strength was evaluated while peeling off the adhesive layer-formed base film from the glass at a peeling rate of 1.8 m/min and a peeling angle of 180°. The peel strength was measured on the same two specimens, and an average value thereof was employed.

Measurement of Residual Rate

An adhesive (Ref.) having peel strength of 1,800±100 gf/in when peeled off from glass at a peeling rate of 1.8 m/min and a peeling angle of 180° was prepared.

Measurement of adhesive strength (B): the adhesive layer of the prepared surface protective film was attached to glass, and after storing the result for 10 days under a condition of a temperature of 60° C. and relative humidity of 90%, the surface protective film was removed from the glass. The adhesive (Ref.) was attached to the surface protective film-removed glass surface, and peel strength was evaluated while peeling off the adhesive (Ref.) at a peeling rate of 1.8 m/min and a peeling angle of 180°. This was employed as adhesive strength (B).

Measurement of adhesive strength (A): the adhesive (Ref.) was attached to glass, and peel strength when peeling off the adhesive (Ref.) from the glass at a peeling rate of 1.8 m/min and a peeling angle of 180° was evaluated. This was employed as adhesive strength (A).

A residual rate was obtained by substituting the adhesive strength (A) and the adhesive strength (B) into the following equation.

$$\text{Residual rate (\%)}=(\text{adhesive strength } (B)/\text{adhesive strength } (A))\times 100$$

TABLE 1

| | Acryl-Based Polymer Molecular Weight (g/mol) | Monomer Type (Weight Ratio) | Acryl-Based Polymer Content (Parts by Weight) | Plasticizer Type (Parts by Weight) |
|---|---|---|---|---|
| Example 1 | 34,000 | BMA/FM-0721/2-HBA (90:5:5) | 5 | — |
| Example 2 | 36,000 | BMA/FM-0721/2-HBA (85:5:10) | 5 | — |
| Example 3 | 29,000 | BMA/FM-0721/2-HBA (86:9:5) | 5 | — |
| Example 4 | 26,000 | BMA/FM-0721/2-HBA (81:9:10) | 5 | — |
| Example 5 | 30,000 | BMA/FM-0721/2-HBA (80:5:15) | 5 | — |
| Comparative Example 1 | — | — | — | — |
| Comparative Example 2 | — | — | — | IPMS (20) |
| Comparative Example 3 | — | — | — | IPMS (40) |
| Comparative Example 4 | 32,000 | BMA (100) | 5 | — |
| Comparative Example 5 | 28,000 | BMA/FM-0721 (90:10) | 5 | — |

TABLE 2

| | Peel Strength (gf/in) | Residual Rate (%) |
|---|---|---|
| Example 1 | 3.7 | 92 |
| Example 2 | 2.8 | 93 |
| Example 3 | 1.7 | 90 |
| Example 4 | 1.6 | 89 |
| Example 5 | 1.5 | 88 |
| Comparative Example 1 | 14 | 92 |
| Comparative Example 2 | 6.2 | 78 |
| Comparative Example 3 | 4.3 | 68 |
| Comparative Example 4 | 13 | 88 |
| Comparative Example 5 | 4.8 | 73 |

From Table 2, it was identified that, when using the surface protective film of the present disclosure, adhesive strength between the adhesive layer and the adherend was low allowing the film to be peeled off with low peel strength, and since there was little residue from the adhesive layer after the peel-off, there was little contamination on the adherend surface.

What is claimed is:

1. An adhesive composition comprising:
a urethane polymer;
an acryl-based polymer; and
a curing agent,
wherein the acryl-based polymer comprises monomer units derived from a (meth) acrylate monomer comprising silicone; and a (meth) acrylate monomer comprising a hydroxyl group,
wherein the acryl-based polymer comprises a copolymer of:
(i) 70% by weight to 98.9% by weight of an alkyl (meth) acrylate monomer having less than 8 carbon atoms;
(ii) 0.1% by weight to 10% by weight of the (meth) acrylate monomer comprising silicone; and
(iii) 1% by weight to 20% by weight of the (meth) acrylate monomer comprising a hydroxyl group,
wherein the acryl-based polymer is included in an amount of 1 parts by weight to 10 parts by weight with respect to 100 parts by weight of the urethane polymer,
wherein the (meth) acrylate monomer comprising silicone has a number average molecular weight of 500 g/mol to 10,000 g/mol
wherein the urethane polymer has a weight average molecular weight of 60,000 g/mol to 160,000 g/mol, and
wherein the monomer unit derived from the (meth) acrylate monomer comprising silicone is represented by Chemical Formula 3:

[Chemical Formula 3]

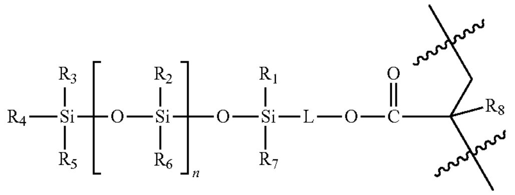

wherein, in Chemical Formula 3,
R1 to R7 are the same as or different from each other, and each independently an alkyl group;
R8 is hydrogen or a methyl group;
n is an integer of 0 or greater; and
L is a linear or branched divalent saturated hydrocarbon group; a divalent monocyclic aliphatic saturated hydrocarbon group; a divalent polycyclic saturated hydrocarbon group; a divalent aromatic hydrocarbon group; a divalent group of a ring having cyclic saturated hydrocarbon fused to aromatic hydrocarbon; —O—; —C(═O)—; —C(═O)—O—; —S—; or a group linking two or more of the groups thereof;
wherein the urethane polymer is obtained by curing a urethane composition comprising a polyol and a multifunctional isocyanate compound; wherein the polyol comprises 2 to 6 hydroxyl groups, wherein an equivalence ratio of an isocyanate group to a hydroxyl group (NCO/OH) in the urethane composition is greater than or equal to 0.1 and less than 1, wherein the urethane polymer has a hydroxyl group value of 3 mgKOH/g to 15 mgKOH/g, and wherein the acryl-based polymer has a hydroxyl group value of 5 mgKOH/g to 40 mgKOH/g.

2. The adhesive composition of claim 1, wherein the acryl-based polymer has a weight average molecular weight of 10,000 g/mol to 60,000 g/mol.

3. The adhesive composition of claim 1, wherein the curing agent is included in an amount of 1 part by weight to 25 parts by weight with respect to 100 parts by weight of the urethane polymer.

4. An adhesive layer comprising a cured material of the adhesive composition of claim 1.

* * * * *